Nov. 4, 1969 M. J. BIRCK 3,476,883

TELEPHONE SIGNALING SYSTEM INCLUDING CARRIER FREQUENCY TRANSMISSION ON VOICE FREQUENCY LOADED PAIRS

Filed Aug. 16, 1966

INVENTOR
MICHAEL J. BIRCK
BY
Patrick J. Roche
ATTORNEY

United States Patent Office 3,476,883

Patented Nov. 4, 1969

3,476,883

TELEPHONE SIGNALING SYSTEM INCLUDING CARRIER FREQUENCY TRANSMISSION ON VOICE FREQUENCY LOADED PAIRS

Michael J. Birck, Clarendon Hills, Ill., assignor, by mesne assignments, to Superior Continental Corporation, a corporation of Delaware Filed Aug. 16, 1966, Ser. No. 572,765

Int. Cl. H04b 3/02

U.S. Cl. 179—78 7 Claims

ABSTRACT OF THE DISCLOSURE

A telephone subscriber conductor pair for simultaneously transmitting voice and carrier frequency signaling current in opposite directions between subscriber and central office terminals, including the subscriber pair transmitting a preselected range of carrier current frequencies and divided into two sections, and a loading coil serially interconnecting adjacent ends of the two sections and comprising a plurality of electric windings wound on a magnetic core, and an inductance-capacitance network connected in parallel with associated pairs of windings and resonant to a predetermined frequency in the preselected carrier current frequency range for improving transmission of both voice and carrier current on the subscriber conductor pair.

Figure 1A:
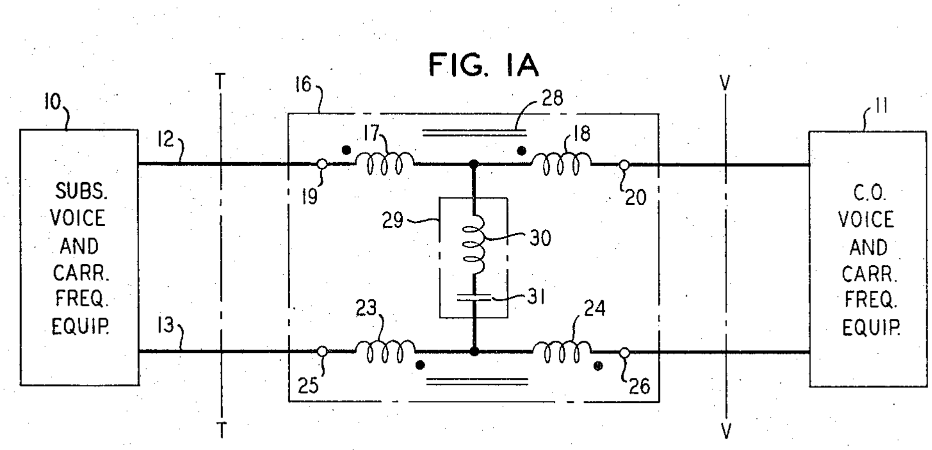

This invention relates to a telephone subscriber's voice frequency signaling transmission line extending between a subscriber's and central office terminals and comprising two conductors adapted to include at least one voice-frequency loading coil therein, and more specifically to such signaling transmission line modified to include an improved voice-frequency loading coil for enabling the establishment of one or more carrier frequency channels thereon.

In my copending application, Serial No. 531,528, filed March 3, 1966, there is disclosed a particular type of voice-frequency loading coil for adapting a telephone subscriber's voice frequency signaling pair to provide simultaneous voice and carrier frequency signaling transmission in opposite directions without deleteriously affecting the voice or carrier signaling transmission between the subscriber's and central office terminals.

The present invention concerns a telephone subscriber's line interconnecting subscriber's and central office voice and carrier frequency equipments and adapted to include improved voice-frequency loading coils without materially adversely affecting the voice or carrier frequency signaling transmission on the line.

A principal object of the present invention is to increase the number of telephone subscribers channels on existing subscribers pairs in a given geographical area without installing additional quantities of subscribers pairs in such area.

Another object is to provide carrier frequency channels on telephone subscribers conductor pairs including voice frequency loading coils.

A further object is to utilize existing telephone subscribers conductor pairs including voice-frequency loading coils for providing carrier frequency channels thereby increasing the number of telephone subscribers facilities on the respective conductor pairs.

An additional object is to improve the economy of telephone subscribers conductor pairs in a telephone plant.

A still further object is to provide an improved voice-frequency loading coil adapted for use on telephone subscribers pairs so as to enable both voice and carrier frequency signaling transmission in opposite directions at the same time on each cable pair.

In association with a telephone subscriber's conductor pair terminated in suitable equipments at the subscriber's and central office terminals for providing both voice and carrier frequency signaling channels thereon in opposite directions at the same time, a specific embodiment of the present invention comprises one or more voice frequency loading coils installed in the subscriber's pair and including first and second pairs of windings, each winding pair having adjacent ends connected together and opposite ends connected to the subscriber's and central office voice and carrier frequency equipments, and a resonant network interconnecting adjacent ends of the respective winding pairs. The resonant network may comprise either a series inductor-capacitor circuit resonant at a predetermined carrier current frequency or two or more parallel inductor-capacitor circuits resonant at two or more different carrier current frequencies one of which includes the predetermined carrier current frequency. The loading coil provides satisfactory transmission properties at voice frequencies, with return loss at voice frequencies and voice-frequency cut-off equivalent to those realized with normal loading coil practices in the art while at the same time providing carrier frequency-transmission with loss equivalent to that experienced on non-loaded loops.

Figure 1B:
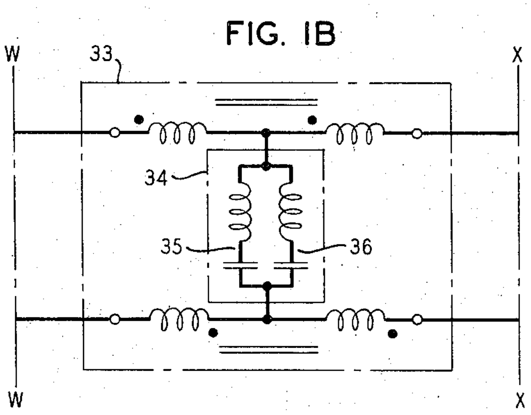
Figure 1C:
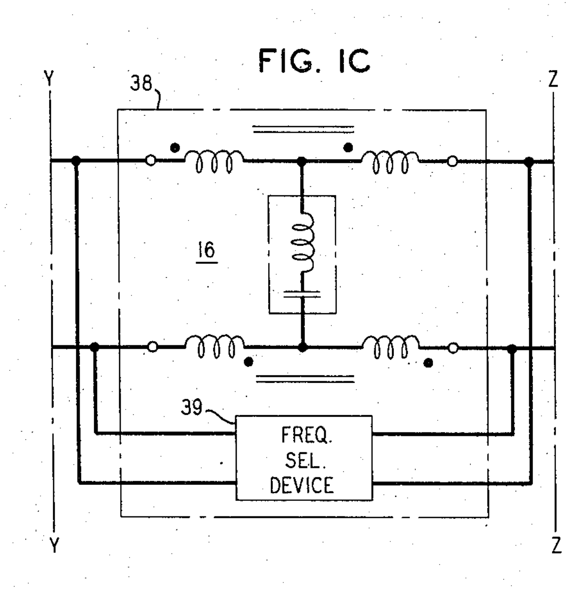

The invention is readily understood from the following description taken together with the accompanying drawing in which:

FIG. 1A is a circuit diagram of a specific embodiment of the invention installed in a subscriber's conductor pair interconnecting subscriber's and central office voice and carrier current terminating equipments; and FIGS. 1B and 1C are modifications of the invention in FIG. 1A.

FIG. 1A shows a subscriber's voice and carrier frequency equipment 10 and a central office voice and carrier frequency equipment 11 interconnected by a subscriber's conductor pair including conductors 12 and 13 for providing simultaneous voice and carrier current signaling transmission in opposite directions as disclosed in my copending application, supra. It is well-known that such conductor pairs include unwanted inherent capacities therebetween whereby undesired loss is introduced in voice-frequency currents.

A specific embodiment of the present invention comprises a voice frequency loading coil 16 including a first pair of discrete windings 17 and 18 having their adjacent ends connected together and opposite ends connected to terminals 19 and 20, respectively, and a second pair of discrete windings 23 and 24 having their adjacent ends connected together and opposite ends connected to terminals 25 and 26, respectively. It is noted that the first pair of windings 17 and 18 is connected in series in conductor 12 while the second pair of windings 23 and 24 is connected in series in conductor 13, both pairs of windings being wound on an annular core 28 for providing magnetic coupling therebetween. The coil so far described is installed at a predetermined point in the conductor pair and provided with an appropriate inductance parameter to compensate in a familiar manner for capacitive effects inherent between the two conductors. This minimizes loss of the voice frequency signaling currents transmitted on the conductor pair. It is understood that the coil is representative of a plurality of such coils connected in tandem in the conductor pair, each coil connected at a predetermined point in the conductor pair. A resonant network 29 comprising inductor 30 and capacitor 31 in series interconnects the adjacent ends of the respective winding pairs for a purpose that is subsequently mentioned.

The network is designed to resonate at a preselected carrier frequency dependent upon the range of carrier frequencies utilized in a given subscriber's voice and carrier frequency signaling system as now explained. In one example involving a use of carrier currents in a frequency range from 10 through 100 kilohertz in FIG. 1A, loading coil 16 was designed to include windings 17, 18, 23 and 24 with a combined inductance of 108 millihenries, inductor 30 with an inductance of 70 microhenries, and capacitor 31 with a capacitance of 0.1 microfarad, and network 29 resonant at a predetermined frequency of 64 kilohertz. This predetermined frequency is located in proximity of the center frequency of the 10–100 kilohertz carrier frequency range, i.e., slightly above such center frequency. This loading coil connected between 150-ohm terminals in one instance and 900-ohm terminals in another instance was found to provide satisfactory transmission of voice and carrier frequency signals consistent with its intended application.

As the loading coil in FIG. 1A tends to function as a 1:1 transformer in the carrier frequency range, an optimum design is one in which the value of the inductance of inductor 30 is varied as a function of frequency while the capacitance of capacitor 31 remains at a predetermined fixed value, or vice versa. This indicates that the resonance curve for the network may be broadened without degrading the voice frequency performance of the loading coil.

Since the resonant frequency of a series resonant circuit is $$\omega r=\frac{1}{\sqrt{LC}}$$

the ideal situation could be provided in FIG. 1A by making $$L_{30}(\omega)=\frac{L_0}{1+\left(\frac{\omega}{\omega_0}\right)^2}$$

or $$C_{31}(\omega)=\frac{C_0}{1+\left(\frac{\omega}{\omega_0}\right)^2}$$

where $$\omega_0 \simeq 2\pi\times20\times10^3 H_z$$

Loading coil 16 in FIG. 1A shown between vertical lines T—T and V—V in FIG. 1A may be replaced by loading coil 33 illustrated between vertical lines W—W and X—X in FIG. 1B by substituting the latter loading coil for the former in FIG. 1A. Loading coil 33 comprises series resonant circuits 35 and 36, similar to network 29, connected in parallel across the adjacent ends of winding pairs 17 and 18 and 23 and 24 as illustrated in FIG. 1B. Except for such two parallel series resonant circuits, it is understood that the circuit of FIG. 1B is otherwise identical with the circuit of FIG. 1A. In FIG. 1B series circuit 35 is, for example, resonant at a carrier frequency of 24 kilohertz while series circuit 36 is resonant at the predetermined carrier frequency of 64 kilohertz. It was found for the circuit of FIG. 1B that the insertion and return losses, as well as the cutoff frequency measured in the circuit of FIG. 1B in the manner of that mentioned above for the circuit of FIG. 1A were satisfactory.

In some instances, the loading coil circuit in FIG. 1C extending between vertical lines Y—Y and Z—Z shown therein may be substituted for loading coil 16 extending between vertical lines T—T and V—V delineated in FIG. 1A by substituting the former circuit for the latter loading coil. It is obvious in FIG. 1C that loading coil 16 is identical circuitwise with corresponding loading coil 16 in FIG. 1A but now a frequency selective device 39 is connected in shunt of the loading coil. This frequency selective device, which may be a high-pass filter of conventional structure serves to by-pass any alternating currents whose frequencies exceed 100 kilohertz and present on the subscriber's conductor pair modified as indicated in FIG. 1C. This enables the loading coil of FIG. 1A used in FIG. 1C to transmit the voice and carrier currents in the manner described hereinbefore in connection with FIG. 1A at frequencies well above the resonant frequency of the tuned circuits. It is obvious that loading coil 33 of FIG. 1B may replace loading coil 16 of FIG. 1A in FIG. 1C.

It is apparent that a network exhibiting a predetermined impedance-frequency characteristic may be substituted for the respective networks in FIGS. 1A, 1B and 1C; and that the shunt inductances of the respective latter figures may be wound on the same core with the main loading coil.

It is understood that the invention herein is described in specific respects for the purpose of this description. It is also understood that such respects are merely illustrative of the application of the principles of the invention. Numerous other arrangements may be devised by those skilled in the art without departing from the spirit and scope of the invention.

What is claimed is:

1. A telephone subscriber voice and carrier frequency current signaling circuit comprising in combination:

a subscriber conductor pair for simultaneously transmitting said voice and carrier frequency current in opposite directions; said pair having unwanted inherent capacitance between the conductors thereof and transmitting said carrier current in a preselected carrier frequency range; said pair divided into at least two sections of which a first section has at least two adjacent conductor ends and a second section has at least two adjacent conductor ends; said two adjacent conductor ends of said first section disposed in proximity of said two adjacent conductor ends of said second section;

and loading coil means serially interconnecting said adjacent conductor ends of said subscriber pair first and second sections to compensate for said subscriber conductor pair inherent capacitance to improve the transmission efficiency of said voice and carrier frequency current on said subscriber conductor, pair including:

a first winding having one end connected to one of said two adjacent conductor ends of said subscriber pair first section and also having an opposite end;

a second winding having one end connected to a second of said two adjacent conductor ends of said subscriber pair first section and also having an opposite end;

a third winding having one end connected to one of said two adjacent conductor ends of said subscriber pair second section and also having an opposite end;

a fourth winding having one end connected to a second of said two adjacent conductor ends of said subscriber pair second section and also having an opposite end;

whereby said first and third windings opposite ends are joined together to connect said last-mentioned windings in series with said one conductor ends of said subscriber pair first and second sections and said second and fourth windings opposite ends are joined together to connect said last-mentioned windings in series with said second conductor ends of said subscriber pair first and second sections;

an annular magnetic core having said first, second, third and fourth windings wound thereon;

and an inductance-capacitance network having one terminal connected to a point common to said first and third windings opposite ends and another terminal connected to a point common to said second and fourth windings opposite ends; said network resonant to at least one predetermined carrier frequency in said preselected carrier frequency range.

2. The telephone subscriber signaling circuit according to claim 1 in which said inductance-capacitance network comprises an inductor and a capacitor joined in series and having a first terminal constituting said network one terminal and a second terminal constituting said network another terminal.

3. The telephone subscriber signaling circuit according to claim 1 in which said inductance-capacitance network comprises a first inductor and a first capacitor joined in series and a second inductor and a second capacitor joined in series; said first and second inductors having corresponding terminals connected together to constitute said network one terminal and said first and second capacitors having corresponding terminals connected together to constitute said network another terminal; said series joined first inductor and first capacitor resonant to said one predetermined carrier current frequency and said series joined second inductor and second capacitor resonant to a carrier current frequency different from said last-mentioned one predetermined carried current frequency.

4. The telephone subscriber signaling circuit according to claim 2 in which said series joined inductor and capacitor are resonant to said one predetermined carrier frequency which is located above a center frequency of said preselected carrier frequency range.

5. The telephone subscriber signaling circuit according to claim 3 in which said series joined first inductor and first capacitor are resonant to said one predetermined carrier frequency which is located above a center frequency of said preselected carrier frequency range; and said series joined second inductor and second capacitor are resonant to said different carrier frequency which is located below said center frequency of said preselected carrier frequency range.

6. The telephone subscriber signaling circuit according to claim 4 in which said loading coil means includes a frequency selective device having four terminals of which a first terminal is connected to a point common to said first winding one end and said one of said two adjacent conductor ends of said subscriber pair first section, a second terminal is connected to a point common to said second winding one end and said second of said two adjacent conductor ends of said subscriber pair first section, a third terminal is connected to a point common to said third winding one end and said one of said two adjacent conductor ends of said subscriber pair second section, and a fourth terminal is connected to a point common to said fourth winding one end and said second of said two adjacent conductor ends of said subscriber pair second section; whereby said last-mentioned device is connected in shunt of said first, second, third and fourth windings, and said series joined inductor and capacitor; said last-mentioned device essentially comprising a high-pass filter for by-passing alternating current having frequencies exceeding said preselected carrier frequency range from each of said subscriber pair first and second sections to the other to enable said last-mentioned windings and series joined inductor and capacitor to improve the transmission efficiency of said voice and carrier frequency current on said subscriber conductor pair.

7. The telephone subscriber signaling circuit according to claim 1 in which said loading coil includes a frequency selective device having four terminals of which a first terminal is connected to a point common to said first winding one end and said one of said two adjacent conductor ends of said subscriber pair first section, a second terminal is connected to a point common to said second winding one end and said second of said two adjacent conductor ends of said subscriber pair first section, a third terminal is connected to a point common to said third winding one end and said one end of said two adjacent conductor ends of said subscribed pair second section, and a fourth terminal is connected to a point common to said fourth winding one end and said second of said two adjacent conductor ends of said subscriber pair second section; whereby said last-mentioned device is connected in shunt of said first, second, third and fourth windings and said inductance-capacitance network; said last-mentioned device essentially comprising a high-pass filter for by-passing alternating current having frequencies exceeding said preselected carrier frequency range from each of said subscriber pair first and second sections to the other to enable said last-mentioned device and inductance-capacitance network to improve the transmission effeciency of said voice and carrier frequency current on said subscriber conductor pair.

References Cited

UNITED STATES PATENTS

| | | | |
|---|---|---|---|
| 1,519,612 | 12/1924 | Hartley | 178—45 |
| 1,726,578 | 9/1929 | Nyquist | 333—29 XR |
| 1,835,930 | 12/1931 | Bush et al. | 178—46 |

KATHLEEN H. CLAFFY, Primary Examiner

JAN S. BLACK, Assistant Examiner

U.S. Cl. X.R.

178—46